(No Model.)

O. JACOBI.
HUB ATTACHING DEVICE.

No. 477,420. Patented June 21, 1892.

Witnesses
J. Edw. Maybee
John E. Cameron

Inventor
Oscar Jacobi
by Donald C. Ridout & Co
Attys.

UNITED STATES PATENT OFFICE.

OSCAR JACOBI, OF MONTREAL, ASSIGNOR OF ONE-HALF TO HERBERT L. BEATTY, OF TORONTO, CANADA.

HUB-ATTACHING DEVICE.

SPECIFICATION forming part of Letters Patent No. 477,420, dated June 21, 1892.

Application filed February 25, 1892. Serial No. 422,774. (No model.)

*To all whom it may concern:*

Be it known that I, OSCAR JACOBI, of the city of Montreal, in the county of Hochelaga, in the Province of Quebec, Canada, have invented a certain new and Improved Device for Holding a Wheel on its Axle, of which the following is a specification.

The object of the invention is to provide a simple device by which a wheel may be instantly locked on its axle in such a manner that the said wheel will revolve and may be removed therefrom without detaching any nut or other fastener, substantially as hereinafter more particularly explained and then definitely claimed.

Figure 1:
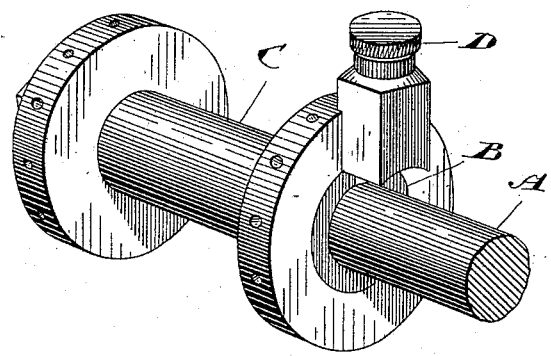
Figure 2:
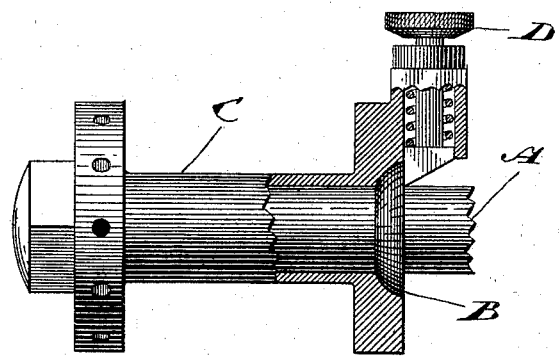

Figure 1 is a perspective view showing the hub of a wheel connected to its axle in accordance with my invention. Fig. 2 is a longitudinal sectional view of Fig. 1.

I may mention here that my device is applicable to any kind of wheel which revolves on its axle; but for the purpose of this specification I have shown it applied to a style of light-iron wheel specially adapted for baby-carriages or bicycles.

A represents the axle, on which a flange B is formed or secured, as indicated.

C is the hub of the wheel. This hub fits onto the axle A and abuts against the flange B, the inner end of the hub C being recessed to receive the flange B, so that its face shall be substantially flush with the face of the hub C.

D is a spring-bolt located upon the face of the hub C and designed to project behind the flange B when the hub has been pushed upon the axle, as indicated in the drawings. The spring-bolt D is shaped so that it will spring over the flange B when the hub C is pushed onto the axle, and when the bolt D has passed the flange B it springs behind the said flange and holds the hub in position.

In order to remove the hub C, it is merely necessary to pull the bolt D clear of the flange B when the said hub may be instantly removed. Owing to the position of the bolts and the fact that the flange B closes the journal on which the hub fits, the said journal can can be kept constantly lubricated and the dirt is completely secluded from the journal.

What I claim as my invention is—

A hub journaled on the end of an axle having a flange working in a recess in said hub, so as to be flush with the face of the same, in combination with a spring-bolt set in a case projecting from the hub, substantially as and for the purpose specified.

Montreal, January 30, 1892.

OSCAR JACOBI.

In presence of—
    W. DE M. MARLER,
    THOMAS PORTEOUS.